US006223090B1

(12) United States Patent
Brungart

(10) Patent No.: US 6,223,090 B1
(45) Date of Patent: Apr. 24, 2001

(54) MANIKIN POSITIONING FOR ACOUSTIC MEASURING

(75) Inventor: Douglas S. Brungart, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/140,063

(22) Filed: Aug. 24, 1998

(51) Int. Cl.[7] .......... G05B 13/02

(52) U.S. Cl. .......... 700/28; 700/280; 381/17

(58) Field of Search .......... 700/28, 280, 56, 700/57, 60, 62; 73/585; 703/6; 600/559; 381/17, 18, 61, 63, 56, 310, 309

(56) References Cited

U.S. PATENT DOCUMENTS

| | | | | |
|---|---|---|---|---|
| 4,026,041 | | 5/1977 | Kennedy | 434/86 |
| 4,850,876 | | 7/1989 | Lutaenko et al. | 434/256 |
| 5,054,729 | | 10/1991 | Mogi | 248/226.11 |
| 5,325,436 | * | 6/1994 | Soli et al. | 381/68 |
| 5,500,900 | * | 3/1996 | Chen et al. | 381/17 |
| 5,729,612 | * | 3/1998 | Abel et al. | 381/56 |
| 5,826,222 | * | 10/1998 | Griffin | 704/207 |
| 6,021,206 | * | 2/2000 | McGrath | 381/310 |
| 6,038,323 | * | 3/2000 | Petroff | 381/1 |

* cited by examiner

*Primary Examiner*—William Grant
*Assistant Examiner*—Kidest Bahta
(74) *Attorney, Agent, or Firm*—Gina S. Tollefson; Gerald B. Hollins; Thomas L. Kundert

(57) ABSTRACT

A computer controlled, three-dimensional, iterative and reiterative, closed-loop system for automatically positioning the head of a manikin situated on a motorized stand relative to a stationary sound source in order to perform accurate near-field Head-Related Transfer Function (HRTF) measurements. The positioning is based on acoustic signals measured from microphones located at each ear of the manikin and is accomplished with three-axis precision for accurate near-field HRTF measuring.

17 Claims, 7 Drawing Sheets

MANIKIN POSITIONING FOR ACOUSTIC MEASURING

RIGHTS OF THE GOVERNMENT

The invention described herein may be manufactured and used by or for the Government of the United States for all governmental purposes without the payment of any royalty.

BACKGROUND OF THE INVENTION

This invention concerns the field of auditory localization and more specifically the field of measuring head related transfer functions (HRTFs).

Over the past decade many researchers have investigated the role of HRTF in spatial hearing. The HRTF represents the relationship between the audio signal generated at a point source in free space and the sound-pressure generated by that source at the eardrums of a human listener, and is typically measured with microphones in the left and right ear canals of a human listener or anthropomorphic manikin. The HRTF includes the effects of sound energy diffraction by the head and torso, as well as spectral shaping by the outer ear and ear canal resonances. The HRTF is typically a function of both frequency and relative orientation between the head and the source of the soundfield. When a sound source is electronically filtered by a HRTF and presented to a listener through headphones, the listener perceives the sound at the location of the source relative to the head when the HRTF is measured. Such a system is known as a virtual audio display.

Traditionally, HRTF measurements have been made in the far field with a sound source disposed at a distance greater than 1 meter. At this distance, an error of a few centimeters in the relative location of the source and head is of no great consequence, since it amounts to no more than a few degrees error in direction. If fact, most loudspeakers used in prior research arrangements measure 7 centimeters or larger in diameter, so the actual effective location of the source is not precisely defined within a few centimeters. When the source is near the head, however, small changes in the relative position of the sound source and the head can have a dramatic impact on the HRTF. The fundamental differences between the "near field" and "far field" as used herein are described in FIG. 1 which is a schematic diagram showing the measurement of the HRTF at close and far distances. In FIG. 1, a sound source is shown at 10 and the dashed lines at 13, 14, 15, 16 and 17 represent the radiating sound wave from the sound source 10. The thickness of each dashed line indicates the intensity of the radiating sound wave, which is inversely proportional to the distance from the source. In order to measure the HRTF in the far field, a manikin head 12 equipped with microphones in the left and right ears is located 1.2 m from the sound source. Note that in the far field the angle of the source relative to the head is relatively insensitive to small changes in the position of the manikin. A displacement of the manikin by 1 cm will change the direction of the source relative to the head not more than 0.5 degrees. In order to measure the HRTF in the near field, manikin head 11 is located 0.25 m from the source. At this distance, the angle of the source relative to the manikin head is much more sensitive to small changes in the position of the manikin head. A 1 cm displacement of the manikin head can change the angle of the source relative to the head by 2.3 degrees. At closer distances, a small displacement in the location of the head can also generate substantial changes in the intensity of the sound reaching the ear.

Because of the precise placement accuracy required for measuring the HRTF at very close distances, the methods that have been used for measuring HRTFs in the far field are not sufficient for making near-field HRTF measurements. It is believed that the best placement solution for near-field HRTF measurements is to place the sound source at a desired distance and elevation relative to the manikin by hand, and then use a motorized stand to rotate the manikin in azimuth. However, it has been discovered that this method could cause large errors in the near field when the center of rotation of the stand is not located directly below the center of the interaural axis of the manikin. When the two centers of rotation are not perfectly aligned, the center of the head moves in a circular pattern as the manikin rotates and the HRTF measurements are corrupted. FIGS. 2*a* and 2*b* show a manikin incorrectly pitched. As used in describing the invention, the orientation of the manikin will be described in relation to a coordinate system with its origin at the point where the manikin 200 is attached to a motorized stand 203. The x-axis of this coordinate system is parallel to the ground and in the direction of the front of the manikin, and the y-axis is parallel to the ground and perpendicular to the x-axis. The z-axis is perpendicular to the ground and increases with increasing elevation. The azimuth of the manikin will be defined as rotation of the motorized stand about the z-axis, increasing with clockwise rotation. The pitch will be defined as rotation around the y-axis, increasing as the manikin is tilted forward. The roll will be defined as rotation around the x-axis, increasing as the manikin is tilted to the left.

FIG. 2*a* shows the manikin 200 tilted slightly so the center of rotation 201 is behind the center of the head 202. FIG. 2*b* is a top view of the FIG. 2*a* manikin and shows that as the manikin 200 having a center of rotation 201 slightly behind the head is rotated in azimuth, the position of the center of the head 202 does not remain fixed but rather traverses a circle 204. Note that the manikin connects to the motorized stand 203 at a baseplate located at the waist of the manikin. The center 202 of the interaural axis is approximately 1 m above this connection, so the center of rotation of the head is displaced by approximately 2 cm for each degree of pitch or roll in the manikin 200 relative to the motorized stand 203, and causes the head to translate through a circle 4 cm in diameter, shown at 204, as the manikin rotates through 360° in azimuth. FIGS. 2*a* and 2*b* illustrate, therefore, that even a small amount of pitch or roll in the manikin 200 is unacceptable when making measurements less than 25 cm from the center of the head. The present invention provides a method and apparatus for ensuring accurate computer controlled positioning of a manikin for near-field HRTF measuring.

SUMMARY OF THE INVENTION

The invention provides a computer controlled, three-dimensional closed-loop system for automatically positioning, relative to a stationary sound source, the head of a manikin situated on a motorized stand. The three-axis positioning is responsive to acoustic signals measured from microphones located at each ear of the manikin and is desirable for accurate near field HRTF measuring.

It is an object of the invention, therefore, to provide computer control for centering the coordinate axes of rotation of a manikin head over a motorized stand.

It is another object of the invention to rapidly and automatically position a manikin in azimuth angle relative to a sound source.

It is another object of the invention to rapidly and automatically position a manikin in roll angle relative to a sound source.

It is another object of the invention to rapidly and automatically position a manikin in pitch angle relative to a sound source.

It is another object of the invention to provide a manikin positioning method for high accuracy HRTF measuring in the near field.

These and other objects of the invention are described in the description, claims and accompanying drawings and are achieved by a computer controlled closed-loop three-dimensional iterative method for positioning an acoustic manikin for head-related transfer function measurements, said method comprising the steps of:

providing a selectively positioned audio signal from a sound source;

receiving said audio signal at left and right ears of said manikin;

transforming time domain representations of said audio signal received at left and right ears of said manikin in a manikin selected axis first position thereof to frequency domain phase values;

computing from said frequency domain phase values to a first phase difference between left ear and right ear signal representations of said manikin;

determining a time delay from said first phase difference from said computing step;

rotating said manikin about said selected axis relative to said sound source in directionally determined response to unequal time delay determinations from said determining step; and repeating said transforming, said computing, said determining and said rotating steps until preselected equal left and right ear time delays and optimal position alignment about said selected axis is obtained relative to said sound source.

DETAILED DESCRIPTION

The invention accurately positions in azimuth, roll and pitch the head of a manikin situated on a motorized rotatable stand relative to a stationary sound source during HRTF measuring so that the center of rotation of the manikin passes through the midpoint of the interaural axis in the manikin. The positioning is iterative, computer controlled and based on the acoustic signals measured from microphones located at the ears of the manikin. The system is helpful for accurate measurement of HRTFs in the near field.

Figure 1:
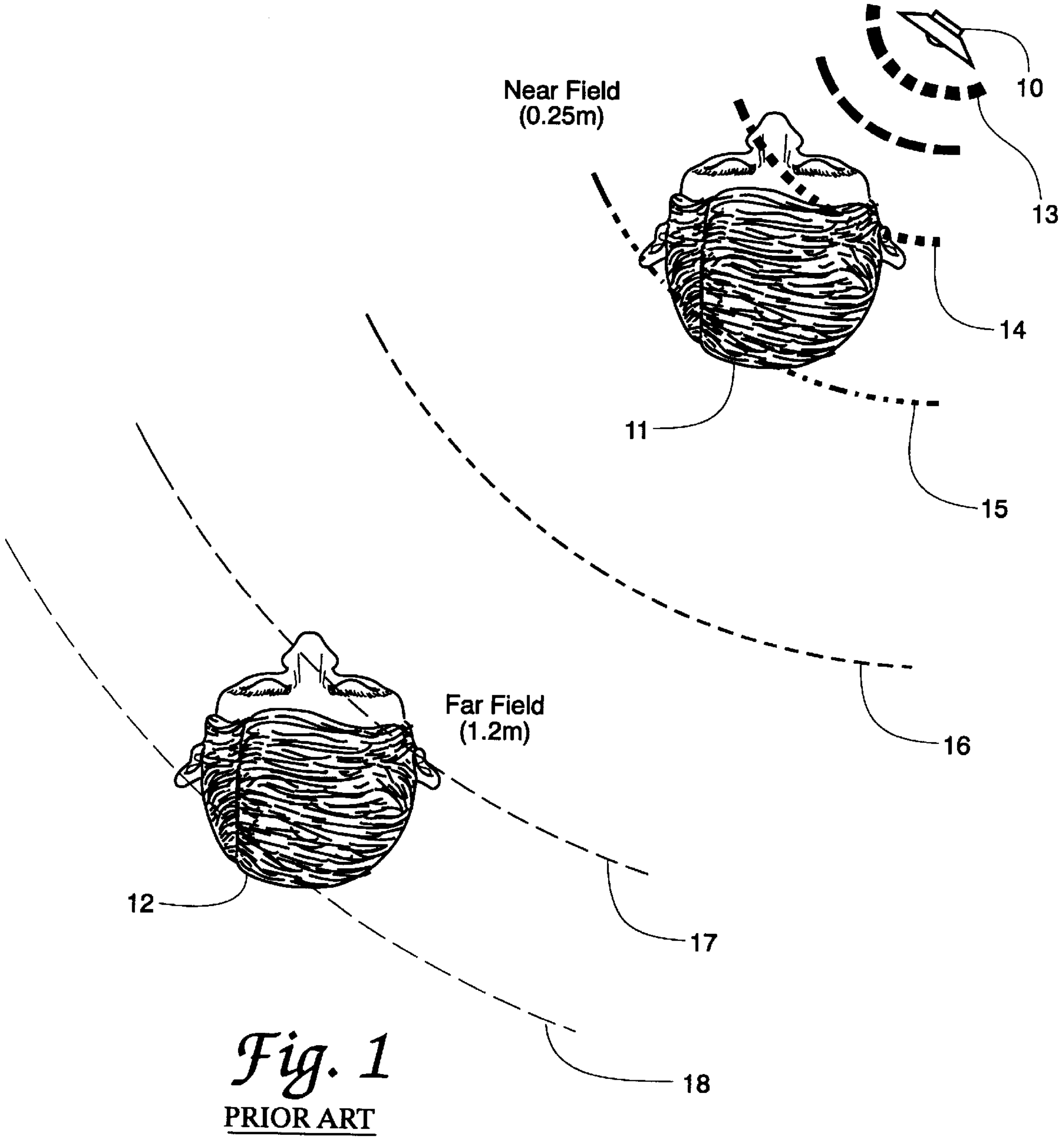
Fig. 1 PRIOR ART
FIG. 1 is a schematic diagram showing a comparison between near field and far field localization cues.
Figure 2A:
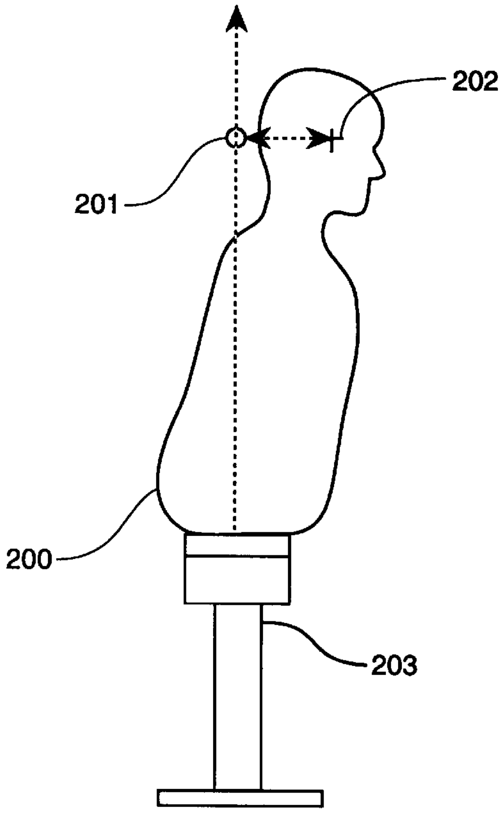
Fig. 2a PRIOR ART
FIG. 2*a* shows a manikin pitched slightly forward.
Figure 2B:
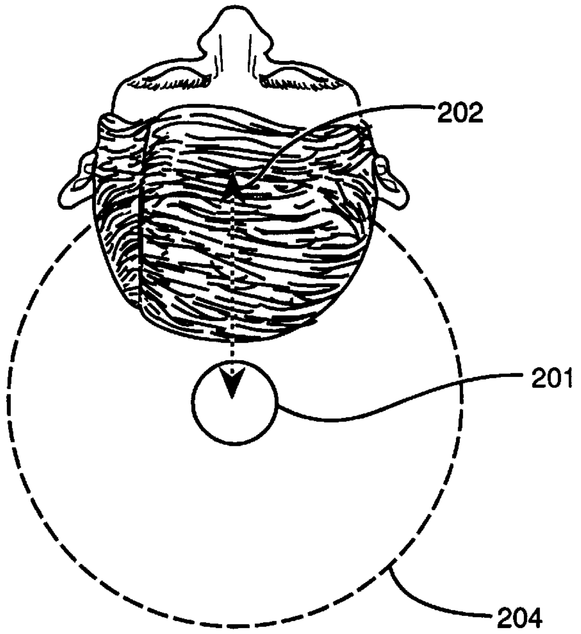
Fig. 2b PRIOR ART
FIG. 2*b* shows the FIG. 2*a* manikin head translating in a circle during rotation.
Figure 3:
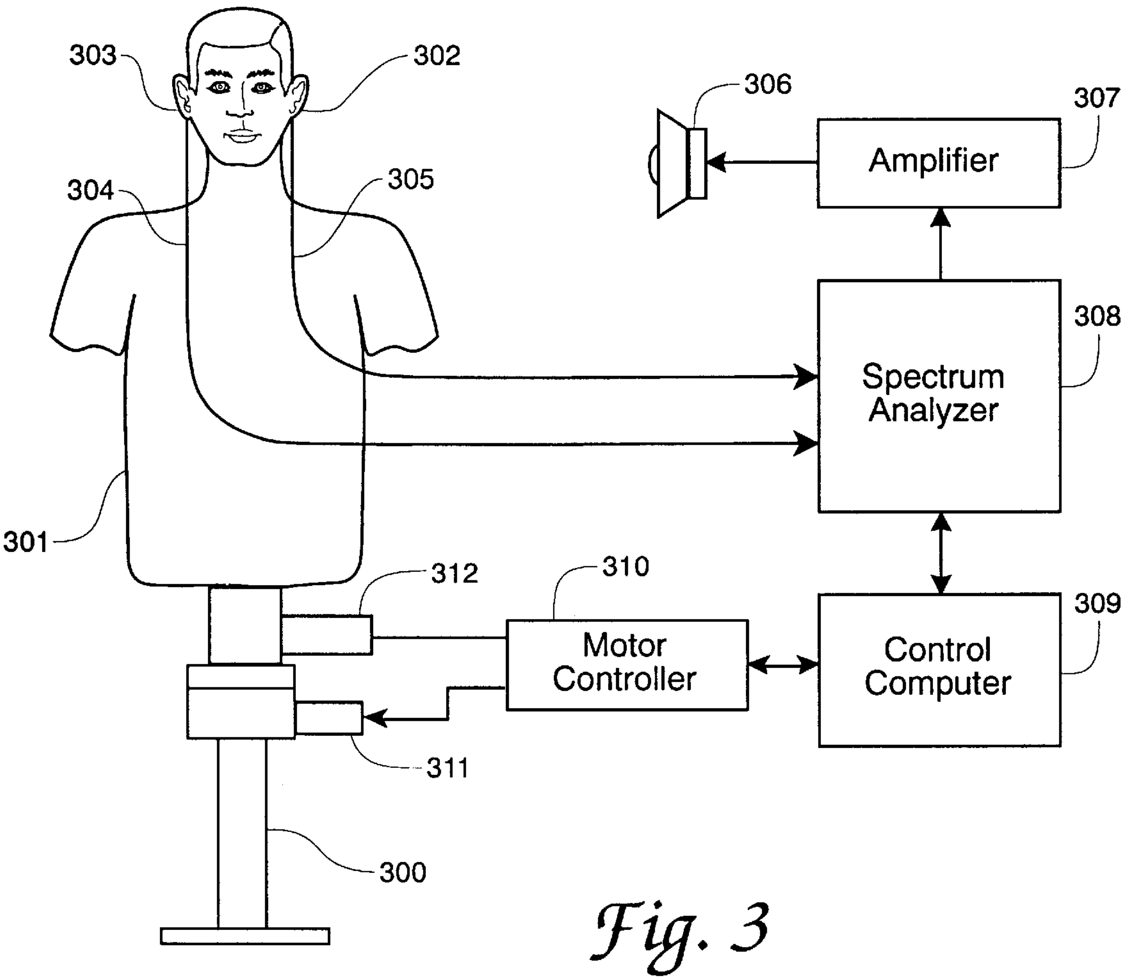
FIG. 3 shows a block diagram arrangement of the invention.

FIG. 3 shows an arrangement of the invention. In the FIG., a manikin 301 is shown disposed on top of a motorized stand 300. The manikin is outfitted with microphones 303 and 302 at the left and right ears, respectively. An amplifier 307 is attached to a sound source 306. The low frequency sound transducer 306 is placed directly in front of the manikin 301 at the desired near field distance. The sound source 306 provides a low frequency signal, ideally in the range of 0 to 6400 Hertz. A sine wave signal could be used.

In operation, the sound source 306 generates an audio signal, which is recorded by the microphones 302 and 303 located at the ears of the manikin 301. The signals recorded by the microphones 302 and 303 are communicated to a spectrum analyzer 308. The spectrum analyzer 308 is coupled to a control computer 309. The control computer 309 is also coupled to a motor controller 310 for motorized positioning control of the stand 300 through control of the motors 311 controlling the azimuth of the stand and 311 controlling the pitch of the stand. The procedure of positioning the manikin 301 relative to the sound source 306 may be accomplished in a three step process, the first step positioning the manikin in azimuth, the second step positioning the manikin in roll and the third step positioning the manikin in pitch. The procedure and device is iterative both within each step and between the three steps. Each step verifies that the manikin 301 is adequately positioned in one dimension and the positioning process is repeated within each dimension until a preselected degree of error is obtained. Each adjustment may displace the manikin 301 in the other two dimensions, so the entire procedure must be repeated until data from all three steps indicate that the manikin 301 is accurately positioned.

The microphone 303, 302 signals are communicated to the spectrum analyzer 308 by two channels shown at 304 and 305. The spectrum analyzer 308 has a channel for processing the recorded signal at each ear. Channel 1 of the analyzer at 305 is connected to the output of the left ear microphone 302 and channel 2 of the analyzer at 304 is connected to the right ear microphone 303. The spectrum analyzer 308 receives the time domain data from microphones 302 and 303 and calculates the phase difference between the microphone signals 304 from the right ear and 305 from the left ear. This is accomplished by setting the analyzer in a frequency response measurement mode that calculates the ratio of the Fourier transform of the channel two signal 305 to the Fourier transform of the channel one signal 304. The resulting data are represented as a series of complex coefficients representing the amplitude and phase of the ratio of the Fourier transforms of signals 304 and 305 as a function of frequency. The amplitudes of these coefficients are disregarded, and only the phase angles of each coefficient, representing the phase differences between the signals at the left and right ears 302 and 303 of manikin 301 at each frequency are considered. Alternately, the Fourier transforms of the left and right ears could be calculated separately, and the phase angle of the transform at the left ear could be subtracted from the phase angle of the transform at the right ear to determine this phase difference.

Figure 8A:
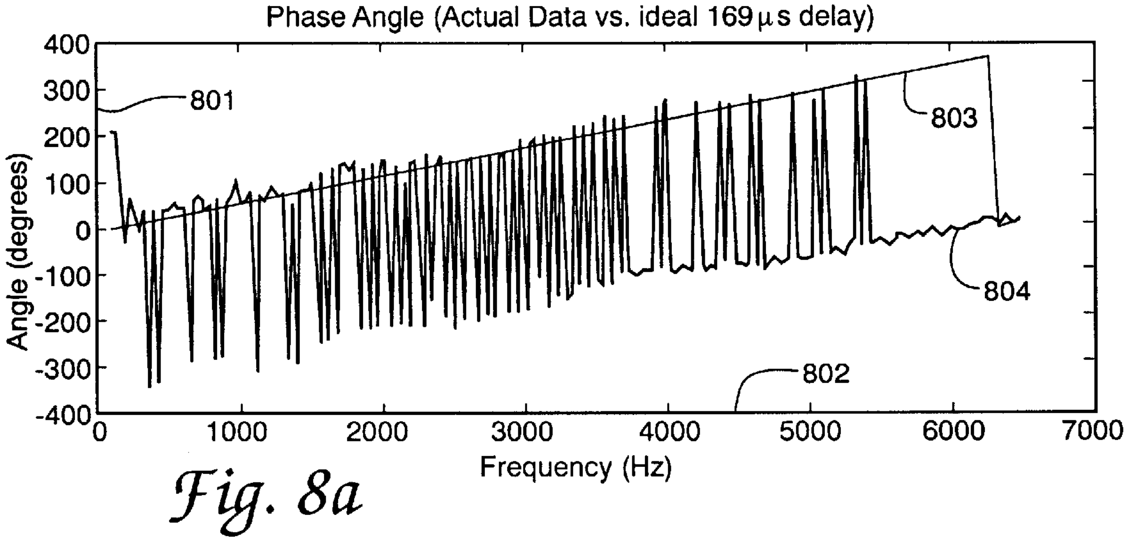
FIG. 8*a* a shows a graph representing a linear relationship between frequency and phase delay.

The difference between the phase data from channel 1 and channel 2 is then used to verify that the manikin is correctly positioned in azimuth, elevation and roll. That is, if the manikin head is not correctly positioned relative to the sound source, there is a delay in time at which the sound reaches one ear relative to the other ear and this delay may be represented by a phase difference determined by the spectrum analyzer 308. The system of the invention uses such phase difference or phase delay measurements from the spectrum analyzer 308 to calculate the time delay in the dimensions of azimuth, roll and pitch for the sound signal received at one ear relative to the other ear. An approximately linear relationship exists between the difference in phase data of channels 1 and 2, and the frequency spectrum, and this relationship permits a representative time delay to be calculated from the phase delay data. The relationship can be described graphically as shown in the graph of FIG. 8*a*. In FIG. 8*a,* the y-axis at 801 represents phase difference in degrees between channels 1 and 2, shown at 304 and 305 of FIG. 3, and the x-axis at 802 in FIG. 8*a* represents frequency. The phase delay as a function of frequency for an ideal time delay of 169 microseconds is shown in line 803. Note that the slope of this ideal line is directly related to the time delay and is equal to (360 degrees * delay)/Hz. Plotting the phase delay for a typical measurement from the manikin of FIG. 3 against a frequency range results in the line of 804. The actual phase difference data of the form shown in line 804 is used to calculate the best estimate of the ideal time delay shown in 803 using a software algorithm written in C++ code and provided as an Appendix hereto and implemented by the control computer 309 in FIG. 3.

Figure 6:
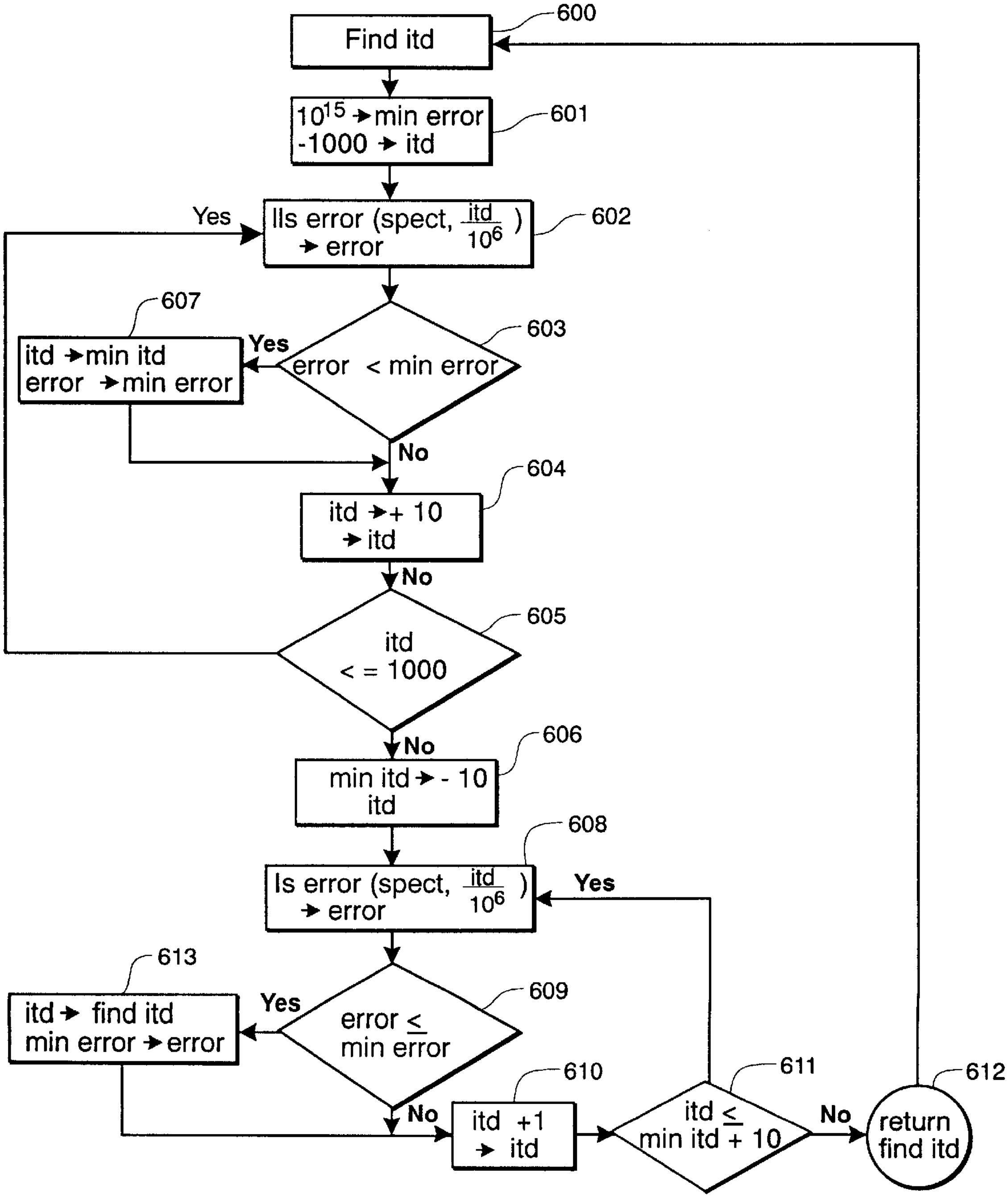
FIG. 6 shows a computer algorithm used to determine time delay.
Figure 7:
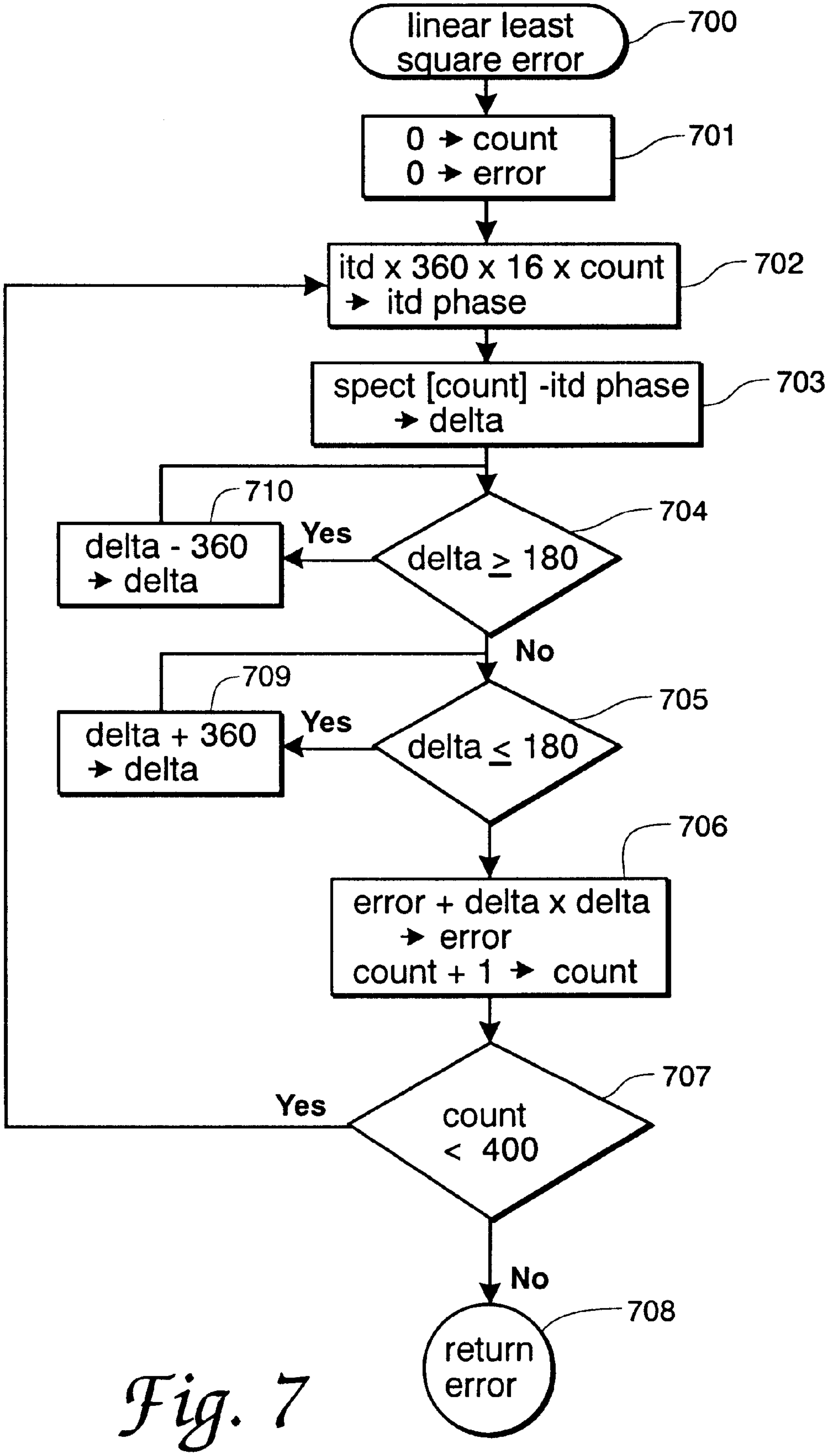
FIG. 7 shows a computer algorithm for determining least square error.

The FIGS. 6 and 7 drawings show flow charts summarizing the software algorithms used to determine interaural time delay values and linear least squares error, respectively. The algorithm represented by the flow chart of FIG. 6 calls and uses the FIG. 7 linear least square error algorithm to generate the interaural time delay. The software algorithms represented in FIGS. 6 and 7 are implemented in the control computer, shown at 309 in FIG. 3. The control computer 309 implements these algorithms after receiving the phase difference data calculated by the spectrum analyzer shown at 308 in FIG. 3.

The control computer 309 in FIG. 3 implements the algorithms represented by FIGS. 6 and 7 first for the azimuth axis in order to find the interaural time delay and reposition the manikin as needed. It continues to run the algorithms until the preselected time delay and associated azimuth position relative to the sound source is attained. The control computer 309 in FIG. 3 then implements the algorithms represented by FIGS. 6 and 7 for the roll axis in order to find the interaural time delay and repositions the manikin as needed. It continues to run the algorithm until the preselected time delay and associated position relative to the sound source is attained.

The control computer 309 in FIG. 3 again implements the algorithms represented by the flow charts of FIGS. 6 and 7 with the manikin considered for accurate pitch positioning to find the interaural time delay and reposition the manikin as needed. It continues to run the algorithm until a preselected time delay and associated position relative to the sound source is attained. Each subsequent adjustment of the manikin in azimuth, roll and pitch may displace the manikin with respect to the axis in the previously considered. The entire procedure of attaining a preselected time delay and associated positioning relative to the sound source in each dimension is preferably repeated until the preselected time delay is attained with respect to each axis and an indication that the manikin is optimized in each axis is obtained.

The FIG. 6 algorithm determines the interaural time delay as stated in box 600. The first step, shown in block 601, initializes a large arbitrary minimum error of 10 to the $15^{th}$ power and a time delay of −1000 microseconds. The minimum error is a large value to ensure that actual errors produced by the algorithm will be less than the initialized value. The time delay is a preselected estimated value based on the assumption that the actual time delay is within the range of −1000 microseconds to +1000 microseconds based on the geometry of the head and physical constraints. That is, the initialized time delay is based on the theory that time propagates at the speed of 1 ms per foot and the maximum interaural time delay is approximated by the distance between the two ears measured across the surface of a manikin head, approximately half the diameter of a manikin head. A time delay of 1000 microseconds, therefore, represents a time delay for an extremely large diameter head of a manikin or human subject.

After the error and estimated interaural time delay (itd) are initialized in block 601, the linear least square (lls) error algorithm is called in block 602. The linear least square error algorithm is disclosed in flow chart form in FIG. 7 and is described in detail infra. Generally, this linear least square error algorithm calculates the error between the initialized time delay value set in block 601 of FIG. 6 and the time delay value of the current position of the manikin determined by the measured interaural phase difference. After a least square error value is obtained using the algorithm represented by the flow chart of FIG. 7, block 603 of FIG. 6 shows that the linear least square error value is compared with the initialized minimum error from block 601. If the least square error value is less than the minimum error value, then the algorithm proceeds as shown in block 607 of FIG. 6 and the minimum interaural time delay and minimum error are reset to be the current estimated time delay value and the least square error value.

The algorithm then proceeds to block 604 where 10 microseconds are added to the interaural time delay estimate so that the next estimate of the interaural time delay is the former estimate plus 10 and this new value will then be considered. Adding 10 to the former estimate eliminates the need to consider the former estimate plus every microsecond value between the former estimate plus 10. It allows one to find the closest error in a 10 microsecond interval. Block 605 of FIG. 6 continues the loop until the interaural time delay estimate is equal to 1000 microseconds, and then terminates the loop. In block 606, the time delay estimate is set to the delay generating the minimum least-squared error minus 10 microseconds. The linear least square error algorithm of FIG. 7 is then called as shown in block 608 of FIG. 6. The linear least square error algorithm again calculates the error between the estimated time delay and the actual value. As shown in block 609, the algorithm next evaluates whether the least square error calculated in block 608 is less than or equal to the minimum error set in block 607. If the error is less than or equal to the minimum error, then as shown in block 613 the minimum error is reset to the least square error calculated in block 608 and the output variable of the function (find_itd) is set to the current delay estimate.

The algorithm proceeds to block 610, which increases the estimate of time delay by 1 microsecond. Block 611 repeats the loop until the estimate of time delay has been incremented through a series of 21 values, in one microsecond steps, within 10 microseconds of the best estimate of interaural delay found in the first part of the algorithm and set in block 607. Once all the time delay estimates within 10 microseconds of the previous best guess have been tested, the function returns the best estimate of the interaural delay (find_itd). Note that the first loop of this algorithm finds the estimate of interaural time delay producing the smallest error relative to the measured interaural phase with 10 microsecond steps. The second loop of the algorithm narrows the search to the vicinity of the best time delay estimate found in the first part of the algorithm and finds the best estimate of the interaural time delay within 1 microsecond.

The loop identified by blocks 602, 603, 604, 605 and 607 is performed 201 times in any single implementation of the algorithm represented by the flow chart of FIG. 7, because the algorithm performs calculations from −1000 microseconds to +1000 microseconds in increments of 10 which is equivalent to 201 calculations. The loop identified by blocks 608 to 611 is performed 21 times because in any single implementation of the algorithm represented by the flow chart of FIG. 7 performs calculations within the range −10 to +10 around the reset minimum interaural time delay, this comprises 21 calculations.

FIG. 7 is a flow chart of the algorithm which calculates linear least square error when implemented by the control computer at 309 in FIG. 3. The discussion of FIG. 6 supra shows the interaural time delay algorithm location where the FIG. 7 linear least square error algorithm is used. The algorithm represented by the flow chart of FIG. 7 first initializes both the frequency count and the error output determination of the algorithm, both values being initialized to zero in block 701. The term "count" in the algorithm keeps track of the frequency variable in the algorithm. The relationship set forth in block 702 states what the phase relationship is at the frequency identified by the variable count. The block 72 relationship is identified as the interaural time delay phase and is equivalent to the interaural time delay multiplied by 360 degrees multiplied by 16 multiplied by count. The interaural time delay is multiplied by 360 degrees to obtain a full period of delay and multiplied by 16 * count, which represents the frequency of the current value in the 400 point frequency spectrum.

In block 703 of FIG. 7, the variable delta is defined as the phase one obtained with a pure delay minus the interaural time delay phase and this variable is the error at the frequency that count represents. The next step of the algorithm represents a deviation from traditional least square error calculations and is believed novel to the invention. Blocks 704 and 705 of FIG. 7 show how the delta value manipulated in the algorithm is within 180 degrees. Block 704 calculates whether the delta value is greater than or equal to 180 degrees and if so, the algorithm proceeds to block 710 which resets delta as delta minus 360 degrees. If the block 704 result is that delta is not greater than or equal to 180 degrees, the algorithm is directed to block 705 where the computer calculates whether delta is less than or equal to 180 and if so, delta is reset in block 709 to delta plus 360 degrees.

Figure 8B:
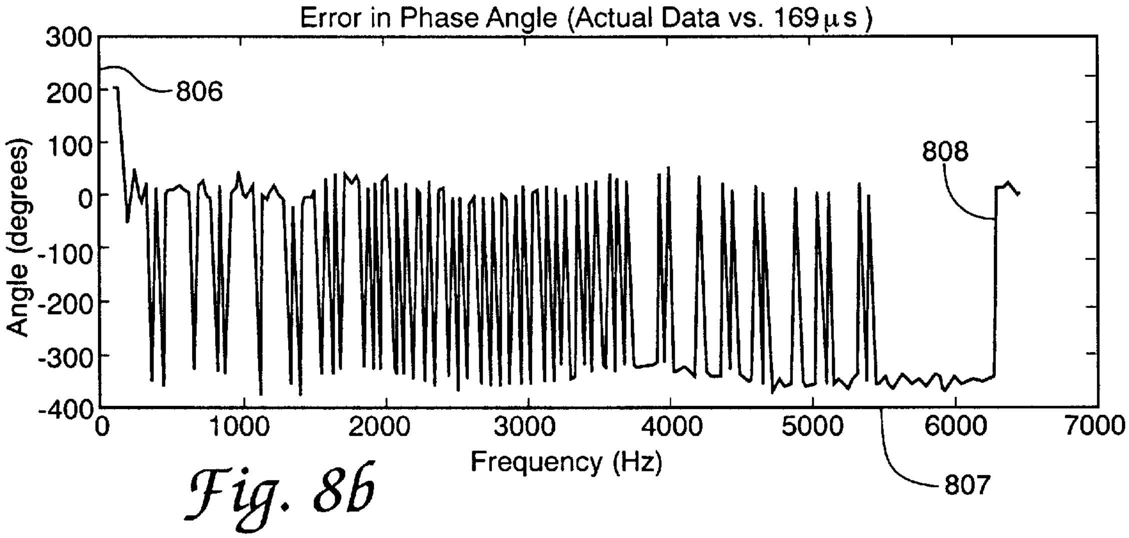
FIG. 8*b* shows a graph representing a typical phase difference spectrum and phase spectrum of estimated time delay.
Figure 8C:
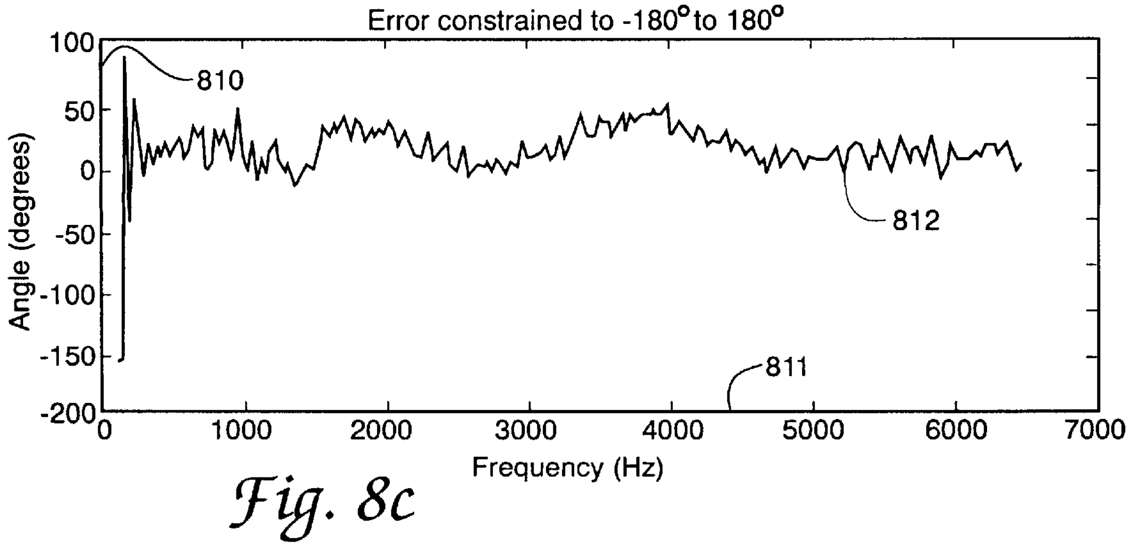
FIG. 8*c* shows a graph representing differences between the actual phase spectrum and the error.

This process is illustrated in FIG. 8*b*. The graph of FIG. 8*b*, with y-axis 806 the phase difference in degrees and x-axis 807 representing frequency, shows in line 808 the difference between the phase of the estimate of time delay 803 and a typical measured phase difference spectrum 804. This line is equivalent to the value of delta after the execution of block 703 in FIG. 7. Note that this error changes frequently from values near 0 degrees to values near −360 degrees, complicating evaluation of the error. In FIG. 8*c*, line 812 represents the difference 808 between the actual phase difference and the error (delta) after processing by the loop represented by blocks 704, 705, 709 and 710 of FIG. 7. Note that the errors represented by 812 are useful for evaluating the accuracy of the time delay estimate 803, while the unprocessed errors represented by line 808 are not.

Block 706 resets the values of count and error, both initially zero in block 701. Count is reset to count +1, which represents the next frequency value. Error is reset to the equivalent of error plus delta multiplied by delta. If variable count, or frequency value is less than 400, as determined in block 707, then the algorithm loops back up to block 702 to again calculate a pure delay value. Once the entire 400 point frequency spectrum is considered, the algorithm ends as shown in block 708. The 400 point frequency spectrum is arbitrarily chosen to match the capabilities of the frequency analyzer used, and is not critical to the algorithm. In order to average out variability, at least 200 points representing frequencies from approximately 100 to approximately 5000 Hz should be used.

Considering the first step of properly positioning the manikin in azimuth relative to the stationary sound source, if there is a positive time delay between channel 1 and channel 2, or the left and right ears, respectively, i.e., a left ear lag, the control computer 309 then communicates a signal to the motor controller 310 to rotate the manikin 301 to the right one degree for every 15 microsecond of delay. Similarly, if there is a negative time delay, or a lag at the right ear, the control computer 309 then communicates a signal to the motor controller 310 to rotate the manikin 301 to the left one degree for every 15 microsecond of delay. This process is iterative and repeated using the algorithms represented in FIGS. 6 and 7 until the interaural delay is reduced below 2 microseconds and the attained location is defined as the zero degree azimuth. Motor controller 310 accomplishes manikin rotation by way of motor 311.

Figure 4A:
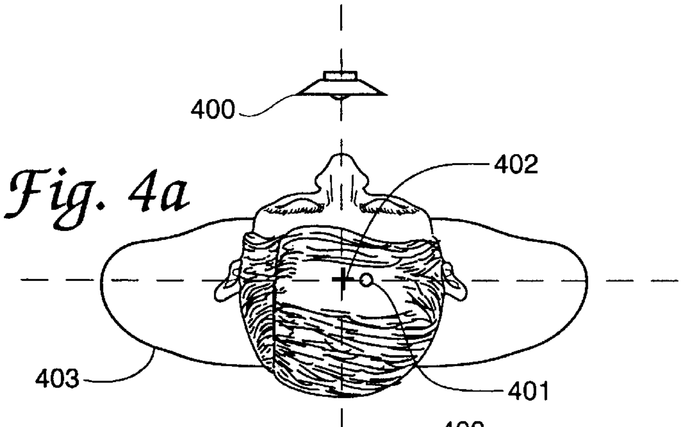
FIG. 4*a* shows a forward facing manikin having an error in roll.
Figure 4B:
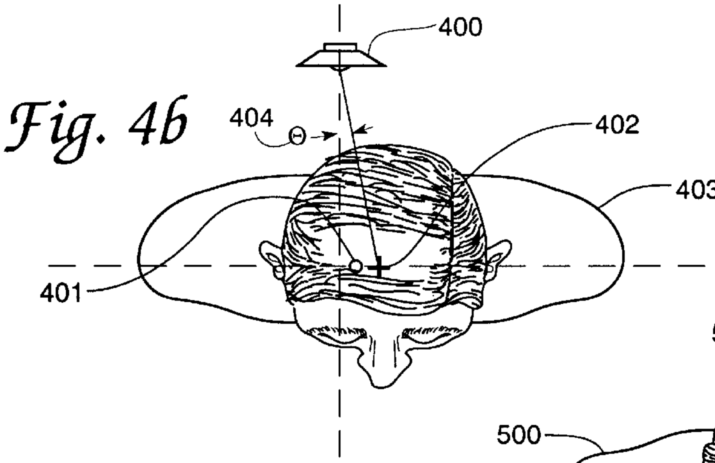
FIG. 4*b* shows a backward facing manikin having an error in roll.

Looking again at FIG. 3, channel 1 at 304 and channel 2 at 305 of the analyzer remain connected to the left and right ears for the second step of the positioning process, positioning the manikin in roll, as illustrated in FIGS. 4*a* and 4*b*. FIGS. 4*a* and 4*b* illustrate positioning of the manikin in roll with the manikin facing forward in FIG. 4*a* and the manikin facing backward in FIG. 4*b*. In FIGS. 4*a* and 4*b*, the sound source is shown at 400, the center of rotation is shown at 401, the center of the head is shown at 402 and the shoulders of the manikin are shown at 403. FIG. 4*a* shows the manikin facing forward with the center of rotation 401 of the manikin head aligned with the sound source for a zero time delay. In the FIG. 4*b* position, the manikin is then rotated 180 degrees as shown in FIG. 4*b* to determine whether any additional positioning is required. The FIG. 4*b* rotation indicates that the sound source 400 is on the right side of the manikin. The manikin is displaced from alignment with sound source 400 by Θ degrees, shown at 404 in FIG. 4*b*. Once the FIG. 4*b* position is achieved, the spectrum analyzer shown at 308 in FIG. 3 then communicates the phase difference information to the control computer 309 in FIG. 3 which calculates the interaural time delay by implementing the algorithms represented in FIGS. 6 and 7. The interaural time delay for the manikin in FIG. 4*b* is negative indicating the manikin needs to be tilted slightly to the manikin's right. Similarly, if there is a positive delay between the left and right ears, the computer tells the operator to tilt the manikin slightly to the left. The measuring process and positioning is repeated until the manikin is positioned such that the time delay is less than 5 microseconds in magnitude.

The third step of the reiterative process considers the manikin's positioning in pitch, that is its forward/backward positioning relative to the sound source as illustrated in FIG. 5. To consider the manikin's position in pitch relative to the sound source, channel 1 at 304 in FIG. 3 is disconnected from the left ear and connected to the electrical input of the sound source 501. In considering pitch, the interaural time delay is no longer measured, rather, the time delay between the sound signal leaving the source and reception at the ear is measured. For pitch angle determination, the phase difference between the front transfer function and the rear transfer function is used to calculate a delay, which corresponds to the difference between the distance the source to the right ear when the manikin faces forward and the distance from the source to the right ear when the manikin is facing backward.

Figure 5A:
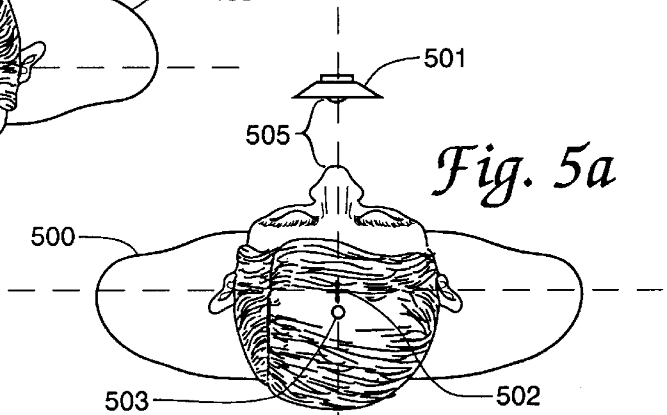
FIG. 5*a* shows a forward facing manikin having an error in pitch.
Figure 5B:
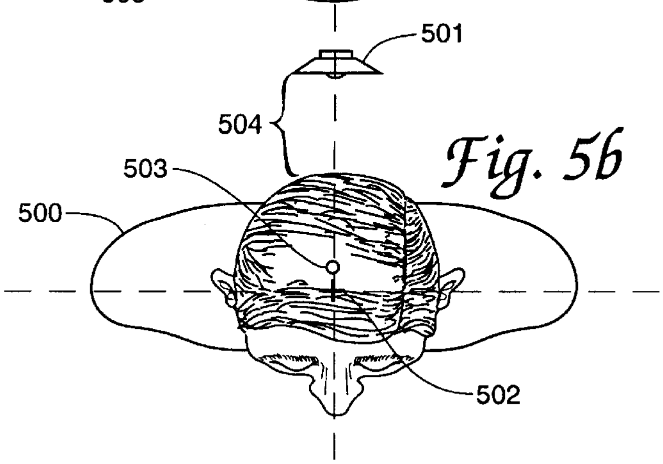
FIG. 5*b* shows a backward facing manikin having an error in pitch.

FIG. 5*a* shows a forward facing manikin located at accurate pitch angle relative to the sound source 501. FIG. 5*b* shows a manikin facing backward having an error in pitch. In FIGS. 5*a* and 5*b*, the sound source is shown at 501, the center of rotation of the manikin is shown at 503 and the center of the head is shown at 502 with the distance between the manikin and the sound source shown at 505 and 504, respectively. The delay from the source 501 to the right ear is longer in FIG. 5*b* where the manikin is facing backward than in FIG. 5*a* where the manikin is facing forward. The relatively longer delay produced by the configuration of FIG. 5*b* at an azimuth position of 180° indicates that the manikin has an error in pitch and should be tilted backwards by a part of the motorized stand 300 in FIG. 3 after receiving direction from the control computer 309. Similarly, if the distance between the sound source and the manikin illustrated at 504 is less than the distance illustrated at 505 indicates that the manikin has an error in pitch and should be tilted forward. This measuring is repeated until the difference between the forward-facing and backward facing delays is less than 10 microseconds.

When all three criteria of the three step reiterative process are met—a time delay less than 2 microseconds in azimuth, a time delay less than 5 microseconds in roll and a time delay less than 10 microseconds in pitch—the manikin at 301 in FIG. 3 is considered to be centered. The preselected time delays are different for each axis and are chosen to ensure that the manikin is within 0.25 degrees in azimuth of directly facing the sound source and the center of the head is displaced no more than 0.25 cm from the axis of azimuthal rotation of the motorized stand.

If it is desired to move the source to a different elevation for further testing, the manikin can be positioned by employing step 1 of the three-step process without checking positioning for roll and pitch.

The invention provides a computer controlled, three-dimensional closed-loop system for automatically positioning the head of a manikin situated on a motorized stand relative to a stationary sound source. The positioning is responsive to acoustic signals measured from microphones located at each ear of the manikin and is desirable for accurate near field HRTF measuring. The invention fills a void in the art for measuring near-field HRTF because positioning techniques used in far-field HRTF measuring cannot be used with acceptable degrees of accuracy in near-field measuring.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. A computer controlled closed-loop three-dimensional iterative positioning method for positioning an acoustic manikin for near field head-related transfer function measurements, said method comprising the steps of:

providing a selectively positioned audio signal from a sound source;

receiving said audio signal at first and second ears of said manikin;

transforming time domain representations of said audio signal received by said manikin in a manikin selected axis first position thereof to frequency domain phase and amplitude values;

first computing from said frequency domain phase and amplitude values a phase difference between said first ear of said manikin and a phase reference point in an azimuth axis relative to said sound source wherein said phase reference point is said second ear of said manikin and further including rotating said manikin in azimuth such that a determined time delay between said first and second ears is minimized and repeating said transforming and first computing;

second computing from said frequency domain phase and amplitude values a phase difference between said first ear of said manikin and a phase reference point wherein said phase reference point is said second ear of said manikin and further including rotating by 180 degrees said manikin about said azimuth axis and rotating said manikin about said selected roll axis such that said time delay between said first and second ears is minimized and repeating said transforming, and second computing steps; and third computing from said frequency domain phase and amplitude values a phase difference between said first ear of said manikin and a phase reference point wherein said phase reference point is said sound source and further including after said receiving step:

ignoring said audio signal at said second ear of said manikin;

after said computing step, rotating said acoustic manikin 180 degrees about said azimuth axis and ignoring said audio signal at said first ear of said manikin;

computing from said frequency domain phase and amplitude values a phase difference between said second ear of said manikin and said sound source;

computing phase difference between said sound source and said first ear before said rotating step and said sound source and said second ear after said rotating step;

rotating said manikin about said selected pitch axis such that said time delay is minimized; and repeating said transforming and third computing steps.

2. The computer controlled closed-loop three-dimensional iterative positioning method of claim 1 for positioning an acoustic manikin for head-related transfer function measurements further including the steps of:

rotating said acoustic manikin 180 degrees about a first selected azimuth axis and repeating said transforming, computing, determining and rotating steps;

rotating said acoustic manikin about a roll second selected axis and repeating said transforming, computing, determining and rotating steps;

rotating said acoustic manikin about a pitch third selected axis thereof and repeating said transforming, computing, determining and rotating steps; and repeating above until optimal alignment of said manikin is attained in azimuth, roll and pitch axes relative to said sound source.

3. The computer controlled closed-loop three-dimensional iterative positioning method of claim 1 for positioning an acoustic manikin for head-related transfer function measurements wherein said providing step further includes providing a selectively positioned, audio signal having a frequency range of 0 to 6400 Hertz.

4. The computer controlled closed-loop three-dimensional iterative positioning method of claim 1 for positioning an acoustic manikin for head-related transfer function measurements wherein said receiving step further includes the step of outfitting said manikin with a microphone at each ear and recording said audio signal thereon.

5. The computer controlled closed-loop three-dimensional iterative positioning method of claim 1 for positioning an acoustic manikin for head-related transfer function measurements wherein said transforming step further includes performing a Fourier transform on said audio signal.

6. The computer controlled closed-loop three-dimensional iterative positioning method of claim 1 for positioning an acoustic manikin for head-related transfer function measurements wherein said transforming step further includes performing an autocorrelation function on said audio signal.

7. A computer controlled closed-loop three-dimensional iterative positioning method for positioning an acoustic manikin for head-related transfer function measurements, said method comprising the steps of:

providing a selectively positioned audio signal from a sound source;

receiving said audio signal at first and second ears of said manikin;

transforming time domain representations of said audio signal received by said manikin in a manikin selected axis first position thereof to frequency domain phase and amplitude values;

computing from said frequency domain phase and amplitude values a phase difference between said first ear of said manikin and a phase reference point;

determining a time delay from said phase difference of said computing step comprising the steps of:

providing estimated error and interaural time delay values;

generating a modified linear least square error between said estimated interaural time delay value at a selected frequency interval within a frequency spectrum and a pure interaural time delay value such that the angular error in each interval is modified to be within the range −180 degrees to 180 degrees;

comparing estimated error and linear least square error, the smaller value being reset as estimated error and the associated interaural time delay reset as the estimated interaural time delay;

repeating above at consecutive frequency intervals within said entire frequency spectrum; and generating an interaural time delay for describing position of said manikin; rotating said manikin about said selected axis relative to said sound source in directionally determined response to time delay determinations from said determining step; and repeating said transforming, said computing, said determining and said rotating steps until a preselected time delay representing optimal position alignment about said selected axis is obtained relative to said sound source.

8. The computer controlled closed-loop three-dimensional iterative positioning method of claim 1 for positioning an acoustic manikin for head-related transfer function measurements wherein said first motorized rotating step includes motorized rotating of said manikin one degree for every 15 microseconds of time delay.

9. The computer controlled closed-loop three-dimensional iterative positioning method of claim 1 for positioning an acoustic manikin for head-related transfer function measurements wherein said preselected time delay in said first motorized rotating step is 2 microseconds.

10. The computer controlled closed-loop three-dimensional iterative positioning method of claim 1 for positioning an acoustic manikin for head-related transfer function measurements wherein said preselected time delay in said second motorized rotating step is 5 microseconds.

11. The computer controlled closed-loop three-dimensional iterative positioning method of claim 1 for wherein said preselected time delay in said third motorized rotating step is 10 microseconds.

12. A computer controlled closed-loop three-dimensional iterative positioning device for measuring near field head-related transfer functions on a manikin having left and right ears comprising:

near field positioned audio signal sound source;

first and second microphones connected in close proximity to said left and right ears for recording said audio signal;

means for transforming said audio signal received at said left and right ears from time domain to frequency domain amplitude and phase;

a signal analyzing device for electronically measuring phase difference between said left and right ears of said acoustic manikin;

a motorized stand for securing said manikin; and a control computer electronically coupled to said motorized stand for calculating a time delay for reception of said audio signals at said left and right ears of said manikin in azimuth, roll and pitch, said control computer generating electronic signals responsive to said time delay and communicating said signals to said motorized stand for incrementally positioning said left and right ears equidistant from said sound source and repeating said incremental positioning within each azimuth, roll and pitch axis and repeating said incremental positioning between each azimuth, roll and pitch axis until a preselected time delay and optimal position is attained.

13. The computer controlled closed-loop three-dimensional iterative positioning device of claim 12 for measuring head-related transfer functions on a manikin having left and right ears wherein the signal analyzing device is a spectrum analyzer.

14. The computer controlled closed-loop three-dimensional iterative positioning device of claim 12 for measuring head-related transfer functions on a manikin having left and right ears wherein means for transforming includes means for performing a fast Fourier transform.

15. The computer controlled closed-loop three-dimensional iterative positioning device of claim 12 for measuring head-related transfer functions on a manikin having left and right ears wherein said audio signal sound source comprises an audio signal having a frequency range between 0 and 6400 Hertz.

16. The computer controlled closed-loop three-dimensional iterative positioning device of claim 12 for measuring head-related transfer functions on a manikin having left and right ears wherein said preselected time delay in azimuth is 2 microseconds.

17. The computer controlled closed-loop three-dimensional iterative positioning device of claim 12 for measuring head-related transfer functions on a manikin having left and right ears wherein said preselected time delay in roll is 5 microseconds.

* * * * *